United States Patent
Kaniyar et al.

(10) Patent No.: US 7,634,655 B2
(45) Date of Patent: Dec. 15, 2009

(54) EFFICIENT HASH TABLE PROTECTION FOR DATA TRANSPORT PROTOCOLS

(75) Inventors: Sanjay Kaniyar, Redmond, WA (US); James T. Pinkerton, Sammamish, WA (US); Bhupinder S. Sethi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1114 days.

(21) Appl. No.: 10/779,414

(22) Filed: Feb. 13, 2004

(65) Prior Publication Data

US 2005/0182929 A1    Aug. 18, 2005

(51) Int. Cl.
*H04L 29/06*    (2006.01)
*H04L 9/32*    (2006.01)
*G06F 12/14*    (2006.01)
*G08B 23/00*    (2006.01)

(52) U.S. Cl. .................. 713/164; 726/22; 726/23; 726/24; 726/25; 726/26; 713/177; 709/223; 709/227

(58) Field of Classification Search ............. 726/22–26; 713/177, 164; 709/223, 227
See application file for complete search history.

(56) References Cited

U.S. PATENT DOCUMENTS

| | | | |
|---|---|---|---|
| 5,371,499 A * | 12/1994 | Graybill et al. ............... 341/51 |
| 6,661,787 B1 * | 12/2003 | O'Connell et al. .......... 370/389 |
| 6,854,117 B1 * | 2/2005 | Roberts ....................... 718/102 |
| 6,990,102 B1 * | 1/2006 | Kaniz et al. ................. 370/392 |
| 7,039,641 B2 * | 5/2006 | Woo ............................ 707/100 |
| 7,058,639 B1 * | 6/2006 | Chatterjee et al. ........... 707/100 |
| 7,076,786 B2 * | 7/2006 | Burd et al. ................... 719/316 |
| 7,110,540 B2 * | 9/2006 | Rajagopal et al. ............. 380/44 |
| 7,159,119 B2 * | 1/2007 | Wilson et al. ............... 713/181 |
| 7,191,341 B2 * | 3/2007 | Paaske et al. ............... 713/189 |
| 7,248,585 B2 * | 7/2007 | Kohn et al. .................. 370/392 |
| 7,254,133 B2 * | 8/2007 | Govindarajan et al. ...... 370/394 |
| 7,277,438 B2 * | 10/2007 | Ambe et al. ................. 370/392 |
| 7,289,502 B1 * | 10/2007 | Gemelli et al. .............. 370/392 |
| 7,325,002 B2 * | 1/2008 | Zuk ............................ 707/102 |
| 7,373,663 B2 * | 5/2008 | Robert ......................... 726/22 |
| 7,379,952 B2 * | 5/2008 | Chan et al. .................. 707/204 |
| 7,409,542 B2 * | 8/2008 | Minnick ...................... 713/153 |
| 2001/0039548 A1 * | 11/2001 | Shinkai et al. .............. 707/201 |

(Continued)

OTHER PUBLICATIONS

George C. Hadjichristofi, et al, "IPSec Overhead in Wireline and Wireless Networks for Web and Email Applications" Proceedings: 2003 IEEE International Performance, Computing and Communications Conference, Apr. 2003, pp. 543-547.

(Continued)

*Primary Examiner*—Christopher A Revak
*Assistant Examiner*—Trang Doan
(74) *Attorney, Agent, or Firm*—Workman Nydegger

(57) ABSTRACT

The present invention protects against denial of service attacks on lookup or hash tables used to store state information for data transfer protocols used to transfer data between two host computers. Two hash tables are provided for holding state information, one for verified remote entities (i.e., those where the remote local address can be traced to a host), and one for unverified entities. A cryptographically secure hash is applied to packets from unverified remote entities, since these are the most likely to attempt attacks on the hash tables. The performance of the local server for packets from verified remote entities, however, is maintained.

34 Claims, 6 Drawing Sheets

U.S. PATENT DOCUMENTS

| | | | |
|---|---|---|---|
| 2002/0023089 A1* | 2/2002 | Woo | 707/101 |
| 2003/0005306 A1* | 1/2003 | Hunt et al. | 713/181 |
| 2003/0026259 A1* | 2/2003 | Brown | 370/392 |
| 2003/0061495 A1* | 3/2003 | Minnick | 713/189 |
| 2003/0084175 A1 | 5/2003 | Kaniyar et al. | 709/230 |
| 2003/0084298 A1* | 5/2003 | Messerges et al. | 713/176 |
| 2003/0084715 A1 | 5/2003 | Zazovsky | |
| 2004/0003286 A1 | 1/2004 | Kaler et al. | |
| 2004/0008681 A1* | 1/2004 | Govindarajan et al. | 370/394 |
| 2004/0013112 A1* | 1/2004 | Goldberg et al. | 370/389 |
| 2004/0049596 A1* | 3/2004 | Schuehler et al. | 709/238 |
| 2004/0111635 A1* | 6/2004 | Boivie et al. | 713/201 |
| 2004/0133798 A1 | 7/2004 | Swander | |

OTHER PUBLICATIONS

Florin Sultan, et al., "Position Summary: Transport Layer Support for Highly-Available Network Services", Proceedings: $8^{th}$ Workshop on Hot Topic in Operating System, May 2001, p. 182.

Yohsuke Takei, et al., "Detecting and Tracing Illegal Access by Using Traffic Pattern Matching Technique," Electronics and Communications in Japan, Part 1, vol. 87, No. 1, 2004, pp. 989-3204 Japan, pp. 61-71.

* cited by examiner

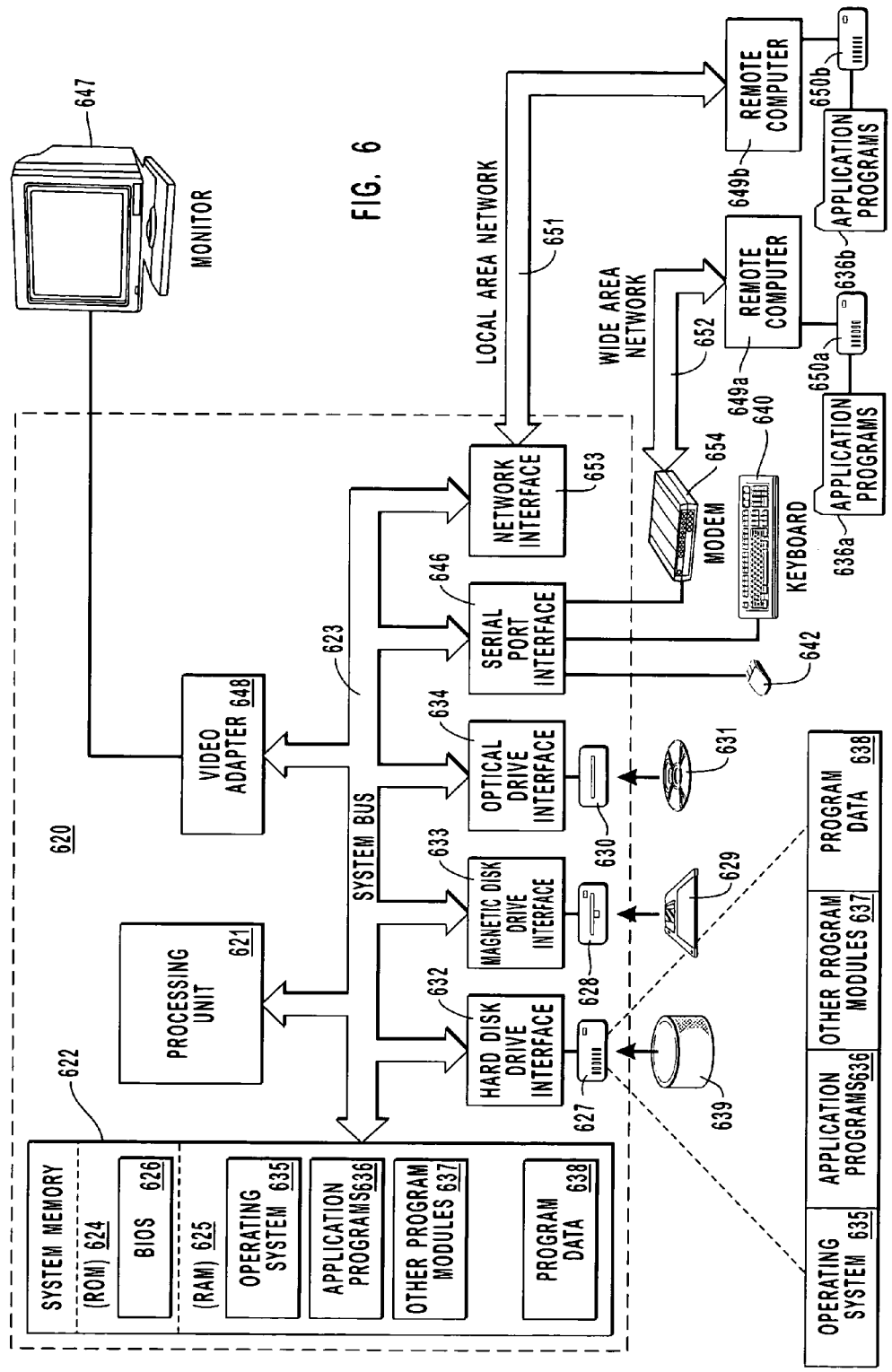

EFFICIENT HASH TABLE PROTECTION FOR DATA TRANSPORT PROTOCOLS

CROSS-REFERENCE TO RELATED APPLICATIONS

N/A

BACKGROUND OF THE INVENTION

1. The Field of the Invention

The present invention generally relates to preventing denial of service attacks over data transport protocols. More specifically, the present invention provides for applying a cryptographically secure hash to packets from unverified remote entities, with the purpose of preventing denial of service attacks on lookup tables used to store state information for one or more remote entities, while maintaining the performance of a local server for packets from verified remote entities.

2. Background and Related Art

Computer systems and related technology effect many aspects of society. Indeed, the computer systems ability to process information has transformed the way we live and work. Computer systems now commonly perform a host of tasks (e.g., word processing, scheduling, database management, etc.) that prior to the advent of the computer system were performed manually. Increasingly, separate computer systems have been coupled to one another to form computer networks over which the computer systems can communicate electronically to share data. As a result, many of the tasks performed at a computer system (e.g., accessing electronic mail and web browsing) include electronic communication with one or more other computer systems via a computer network (e.g., the Internet).

Often, electronic communication on a computer network includes a client computer system (hereinafter referred to as a "remote client" or "remote entity") requesting access to a service (e.g., electronic mail or a web page) at a server computer system (hereinafter referred to as a "local server"). Before granting the client or entity access to the service, the server may issue a challenge to the client requiring the client to prove it's identity to the server. A challenge may be a relatively simple one, for example, challenging a user at the client to enter user-name and password. On the other hand, a challenge may be more complex, such as challenging the client to correctly perform a complex handshake sequence.

One reliable data transport protocol that uses a handshake sequence when challenging a client is known as transmission control protocol (TCP). TCP is used for establishing reliable bidirectional streams, like those used for remote terminal connections (established with telnet or login utilities). TCP is also used for transferring large amounts of data, for example, with file transfer protocol (FTP) or by connecting to a Web server.

Unlike most other parts of the Internet Protocol suite (such as Internet Control Message Protocol (ICMP) or User Datagram Protocol (UDP)), TCP establishes a connection between the local and remote site. As mentioned above, these TCP connections are generally reliable and secure, and therefore a challenge to the client in the form of a handshake is used to prevent attackers from gaining access to the connection.

FIG. 1 illustrates a typical TCP three way handshake, i.e., the exchange of three messages, used to establish a connection between a remote client 105 and a local server 110. The remote client 105 sends an initial synchronization (SYN) segment, which includes an initial sequence number (ISN), shown here as $ISN_C$. The local server 110 responds with a SYN 125 comprising its own ISN (shown here as $ISN_S$), and an acknowledgement (ACK) 120. This ACK 120 includes the $ISN_C$ received from the remote client 105 plus one, which among other things lets the remote client 105 know that the local server 110 received it's SYN.

Similar to the local server 110, when the client system 105 receives the SYN 125 and ACK 120 packet, it must send back its own ACK message 130, which will include the local server's 110 $ISN_S$ plus one. The $ISN_S$ generated from the remote client 105 and the local server 110 are used not only to assign sequence numbers to data packets exchanged between the two, but also as a way to ensure that each received the appropriate package and that each is communicating with the entity they initially believed to be communicating.

To protect against spoofing attacks (i.e., those attacks where an attacker floods the local server with data packets from a spoofed address by knowing or predicting the sequence numbers used), many operating systems use random number generators to choose TCP ISNs. Typically, the ISNs are generated using data unique to the connection, e.g., connection identifier or key information (usually some combination of source/destination routing address and port). This information, or at least a portion thereof, may be hashed using secure hash function in order to generate an ISN intended to be unpredictable.

For each connection requested, or established, TCP also creates and maintains a data structure called a transmission control block (TCB), which includes, e.g., state variables for the connection. For example, when a SYN segment is received for requesting a connection, a TCB may be created that may include information about the ISN generated, expected round trip time of data packets, etc. Further, once a connection is established, the TCB continues maintaining information about, e.g., a connection state, its associated local process, feedback parameters about the connection's transmission properties, expected sequence numbers, etc.

TCBs are maintained on a per-connection basis and are stored in a hash table that allows for efficient lookups. FIG. 2 illustrates an example of a typical TCB lookup table 200 used for storing and maintaining state information for each connection. When a remote client requests a connection, i.e., sends a SYN, a TCB 215 is generated and indexed within TCB lookup table 200. Typically, the index 205 is determined based on a simple hash 220 of information unique to the connection, e.g., the connection key 210. When a data segment subsequently comes in from the network, one of the first tasks performed is to find the matching TCB 215 for that segment. Accordingly, the information unique to the connection 210 is again hashed 220, yielding the appropriate index 205 containing the TCB 215 and the corresponding state information.

Because TCBs are maintained on a per-connection basis, as the number of connections maintained increases, the number of maintained TCBs also increases. Recently, hackers are attacking this lookup methodology by making TCP hash all (or most) of the TCBs it creates to the same hash index. This makes each lookup take much longer than usual because what should be a hashed lookup devolves into a sequential one. This attack is possible because the hash function currently used by the TCP is simple and insecure. That is, the attackers are able to determine the hash function used to index TCBs, and similar to the spoofing problem mentioned above for ISNs, attackers can flood the local server with connection identifiers that hash TCBs into one index. Due to the prolonged lookups, any subsequent legitimate remote entities that attempt to connect to the local server are likely to experience poor response times or will be unable to connect because submitted connection requests will time out.

One solution to this DoS attack is to use a secure hash for the lookup tables. For example, similar to the secure hash function used to generate the ISNs, a cryptographically secure hash can be used to produce indices that cannot be easily predicted. The problem with this solution, however, is that securely hashing connection identification information for each packet of data received by the local server consumes considerable CPU cycles, thereby reducing the overall performance of the local server system. Accordingly, there exists a need for preventing DoS attacks on lookup tables, while maintaining the performance of the local server.

BRIEF SUMMARY OF THE INVENTION

In accordance with exemplary embodiments of the present invention, the above-identified deficiencies and drawbacks of current data transport protocols are overcome. For example, exemplary embodiments provide for applying a cryptographically secure hash to packets from unverified remote entities for preventing denial of service attacks on lookup tables used to store state information for one or more remote entities. The performance of the local server for packets from verified remote entities, however, is maintained.

Example embodiments provide that when a packet of data is received from a remote entity that includes connection identifier information, at least a portion of the connection identifier information is hashed using a first hash function for determining if state information exists for the remote entity in a table of verified remote entities. It is noted that lookups in verified hash tables currently happen in typical data transport protocols. As such, keeping separate tables does not introduce overhead for legitimate traffic.

In any event, further example embodiments provide that if the state information for the remote entity does not exist in the table of verified remote entities, at least a portion of the connection identifier information is hashed using a second hash function that is cryptographically secure for determining if state information exists for the remote entity in a table of unverified remote entities. If the state information for the remote entity exists in the table of unverified remote entities, secret information provided within the packet of data is compared with information previously supplied to the remote entity for determining if the remote entity can be verified such that state information can be moved to the table of verified remote entities. Although this transfer of state information from one table to another introduces some overhead, it happens only once per connection and it is inconsequential to simply move data from one table to another.

Further embodiments provide that if, on the other hand, state information for the remote entity does not exist in the table of unverified remote entities, a check is performed to see whether the local server is a listener for that particular packet. In other words, a check is done to make sure that the local server has a listening port for receiving the type of traffic or data packets sent by the remote entity. If this check succeeds, state information for the remote entity should be created in the table of unverified remote entities.

Other example embodiments provide that if the state information for the remote entity exists in the table of unverified remote entities, but the packet being processed does not complete the verification process, the server can choose to retransmit the synchronization-acknowledgement message, choose to silently discard the packet, choose to delete state, or perform some other action, based on the contents of the incoming packet (for example, based on whether the packet includes a synchronization message or not).

In still other example embodiments, if state information for the remote entity does not exist in both the table of verified remote entities or table of unverified remote entities and the server is a listener that may accept the package of data from the remote entity, state information for the remote entity may be created within the table of unverified remote entities. Further, a synchronization-acknowledgement packet may be sent to the remote entity that includes an initial sequence number.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 illustrates an example system that provides a suitable operating environment for the present invention.

DETAILED DESCRIPTION OF THE PREFERRED EMBODIMENTS

The present invention extends to methods, systems and computer program products for preventing denial of service attacks on lookup tables used to store state information for one or more remote entities for data transmissions using a data transport protocol. The embodiments of the present invention may comprise a special purpose or general-purpose computer including various computer hardware, as discussed in greater detail below.

The present invention provides efficient hash or lookup table protection for data transport protocols, e.g., transmission control protocol (TCP). Because the aforementioned denial of service (DoS) attacks generally occur only when the remote local address is not a valid Internet address (otherwise the attacker would be caught), example embodiments will divide transmission control blocks (TCBs), or state information for a remote entity, into two categories; verified and unverified. Verified, as implied above, are those remote entities that have a confirmed connection identifier (i.e., the remote address and port have been authenticated through a shared secret between the local server and the remote entity), whereas unverified remote entities have not been verified. For example, in TCP, verified remote entities are those entities with which the local server has established a connection after completing a successful handshake—it is noted, however, that other methods of verification are possible; accordingly the above example is not meant to limit or narrow the scope of the present invention. Depending on the verification status of the remote entity, state information for the remote entity is hashed and stored in either a table of unverified or a table of verified remote entities.

Figure 1:
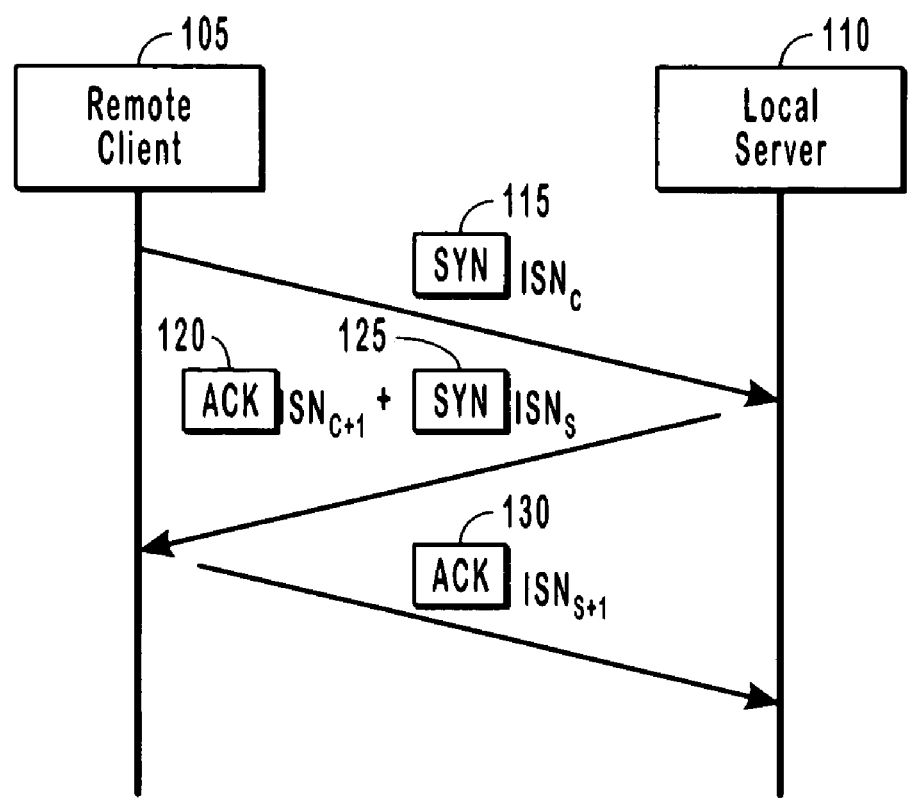
FIG. 1 illustrates a typical three way handshake between a remote client and a local server when establishing a connection for transferring data in accordance with a data transport protocol.
Figure 2:
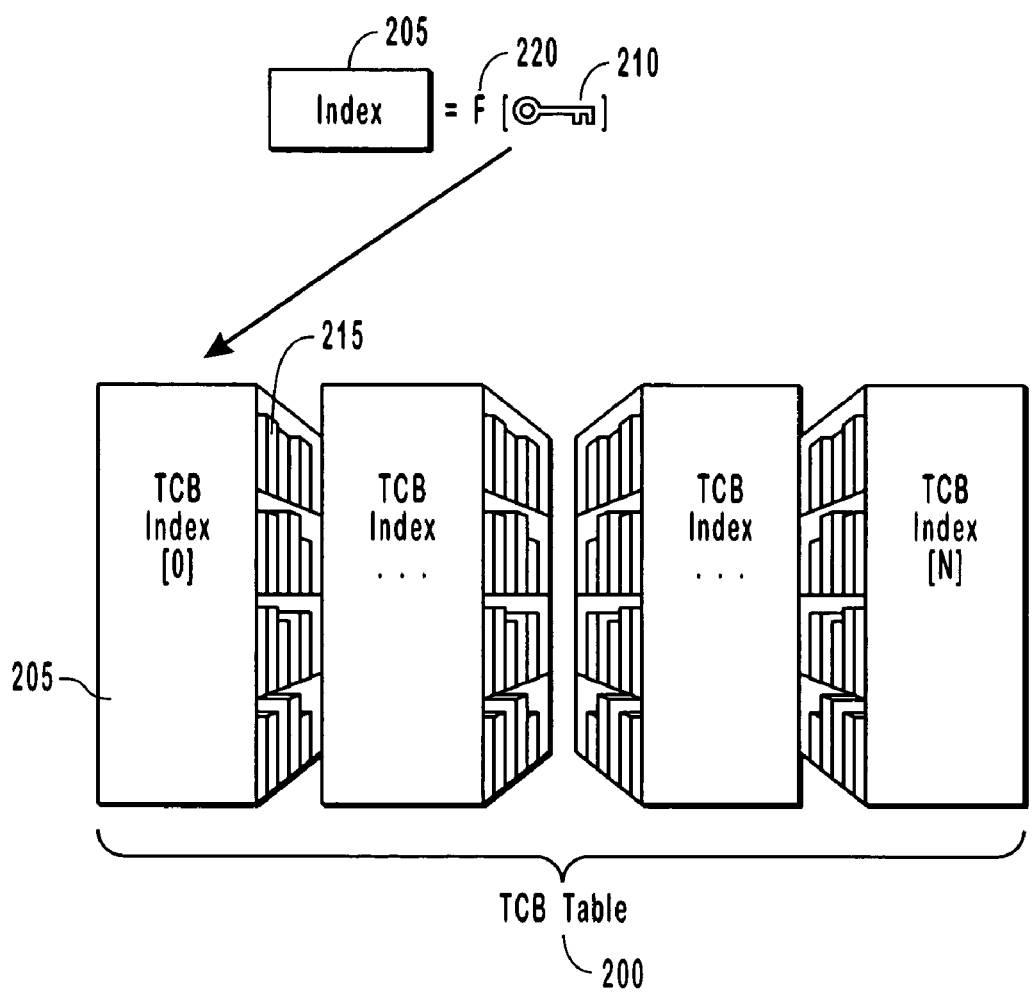
FIG. 2 illustrates a typical indexing for transmission control blocks (TCBs) within a TCB lookup table.
Figure 3:
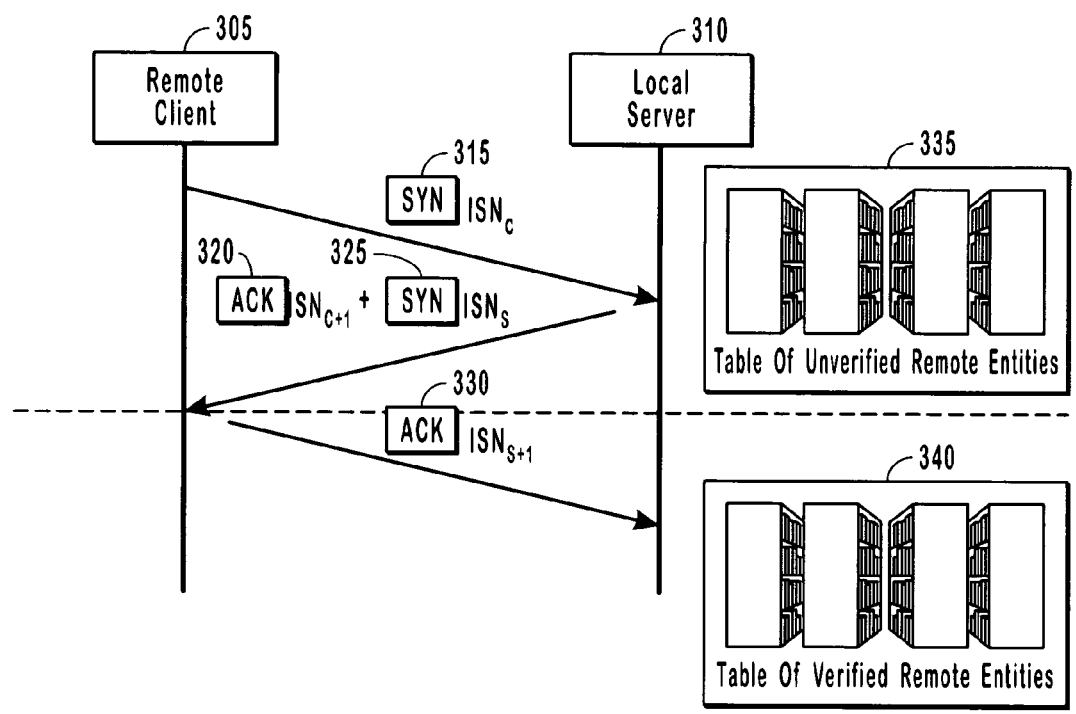
FIG. 3 illustrates the division between a table of unverified remote entities and a table of verified remote entities in accordance with example embodiments.

FIG. 3 illustrates an example embodiment for the dividing point in a typical three way handshake process where the status of a connection (and therefore the connection state information) is divided into either an unverified hash table or a verified hash table. As previously discussed, a three way handshake is initiated by the remote client or entity 105 by sending a synchronization (SYN) message to local server 310. Example embodiments provide that when the SYN 315 is received by the local server 310, the local server 310 hashes at least a portion of the connection identifier information, which usually includes some combination of source/destination routing address and port. Based on at least a portion of this hashed value generated (i.e., at least a portion of the hash value is the index value in the table of verified remote entities 340), the local server 310 looks up in the verified hash table 340 to determine if state information for the remote entity 305 exists. Example embodiments provide that the hash function used to generate the hash value is a simple function in order to limit CPU cycles and maintain performance of the system. It is noted, however, that the hash function for the verified hash table 340 could also be a cryptographically secure one, such as the one described below regarding the table of unverified remote entities 335.

In any event, because in this example, the SYN is initializing a connection, state information for the remote entity 305 will not be found in the table of verified remote entities 340. As such, the local server 310 checks the unverified hash table 335 to determine if state information exists for the remote entity 305 there. Similar to the lookup for table of verified remote entities 340, a hash of at least a portion of the connection identifier information is performed to generate a hash value, at least a portion of which is used as an index identifier for the table of unverified remote entities 335. In this case, a cryptographically secure hash function is applied for looking up state information in the table of unverified remote entities. The secure hash prevents hackers from constructing connection identifier information that hashes to the same index. Further, this cryptographically secure hash, as any such described herein, can be either software or hardware based. It should also be noted, the lookup in the verified hash currently happens in typical data transport protocols. As such, keeping separate tables does not introduce overhead for legitimate traffic.

In any event, again because in this example the remote entity 305 is initiating a connection, there will be no state connection information for the remote entity. Because in this case, no state information exists in the verified 340 or unverified 335 tables, the local server 310 checks to see if the SYN flag within the message is set. Again, in this example it would be. As such, example embodiments provide that the local server 310 checks for a listener, i.e., that it is expecting this type of message. Assuming that the local server 310 is a listener that may accept the packet 315, example embodiments further provide that the local server 310 creates a transmission control block (TCB) or state information for the remote client 305 in the table of unverified remote entities. Further, as previously mentioned, every time a connection is requested using a SYN 315, an initial sequence number (ISN) is generated by the local server 310 for the purpose of responding back to the requestor. Accordingly, this ISN is sent in an SYN+ACK message 325, 320 back to the remote client 305. Example embodiments also store the ISN as part of the state information within the table of unverified remote entities 335. As described below, it is this ISN information that can be used as a shared secret between the remote client 305 and the local server 310 in authenticating the remote client's 305 connection identifier information.

It should be noted that local sever 310 could have initially checked for SYN flag within message 315 prior to hashing for lookup in either unverified 335 or verified 340 tables. The present invention, however, is also looking for potential attacks, as well as monitoring other failures within the system, e.g., corrupted data. Accordingly, a preferred embodiment is that the state information of the remote client should be checked in both the verified 340 and unverified 335 tables in the manner mentioned above.

As previously described for normal three-way handshake messaging protocol, when the remote client receives the SYN+ACK 325,320 from the local server 310, it constructs an ACK 330 that includes the ISN plus one and sends this back to local server 310. Example embodiments provide that the local server 310 will go through a similar lookup process as that described above. In particular, the local server 310 will first hash and lookup in the table of verified remote entities 340 for state information for the remote entity 305, and then hash and lookup state information in the table of unverified remote entities 335. In this instance, local server 310 will find state information (including possibly the ISN generated) within the appropriate index of table of unverified remote entities 335.

At this point, the local server 310 will check to determine if the message received is an ACK message 330, which it is. Accordingly, the local server 310 can then verify or authenticate the remote client's connection identifier information by comparing the ISN retrieved from the state information against the ISN information in the packet (ISN-plus-one information). Provided the information within the ACK message 330 is what the local server 310 was expecting, the remote entity 305 now becomes verified, and therefore the state information within table of unverified remote entities 335 for the remote entity 305 can be moved to the table of verified remote entities 340.

Because state information for a remote client is converted into verified information only when a correct response from the peer is received, it is not possible for an attacker to force the conversion from unverified to verified. In particular, because the remote host must know the exact ISN (or other secret shared between the remote client 305 and the local server 310), an attacker will be unable to move state information into the table of verified remote entities 340 without knowledge of the secret. As previously mentioned, since the ISN generated in response to a new connection request needs to be secure, example embodiments provide for using a cryptographically secure hash function (e.g. MD5, SHA, Toeplitz, etc.) with some private key to generate it. Moreover, in the case where the remote entity 305 is an attacker, no response will be received and the state information or TCB within the table of unverified remote entities 335 will eventually time-out.

It should be noted that under normal operation, typically, a secure hash-computation will be performed twice, and the secure hash lookup for the table of unverified remote entities 335 will to be performed once—this is the additional cost incurred above typical lookup protocols. When under attack, however, there won't be any response, and there will be one secure hash-computation and no secure hash-lookup; this cost is worth the resilience that this mechanism provides under attack. Further, in some circumstances it may be desirable to use the secure hash that generated the ISN, thereby eliminating the overhead.

In summary, example embodiments provided for applying a cryptographically secure hash to packets from unverified remote entities for preventing denial of service attacks on lookup tables used to store state information for one or more remote entities. A separate table is used to store state information for remote entities that have been verified. Because the lookups in verified hash tables currently happens in typical data transport protocols, keeping separate tables does not introduce overhead for legitimate traffic. Accordingly, the present invention provides for preventing denial of service attacks on lookup tables used to store state information for one or more remote entities, while maintaining the performance of a local server.

Figure 4:
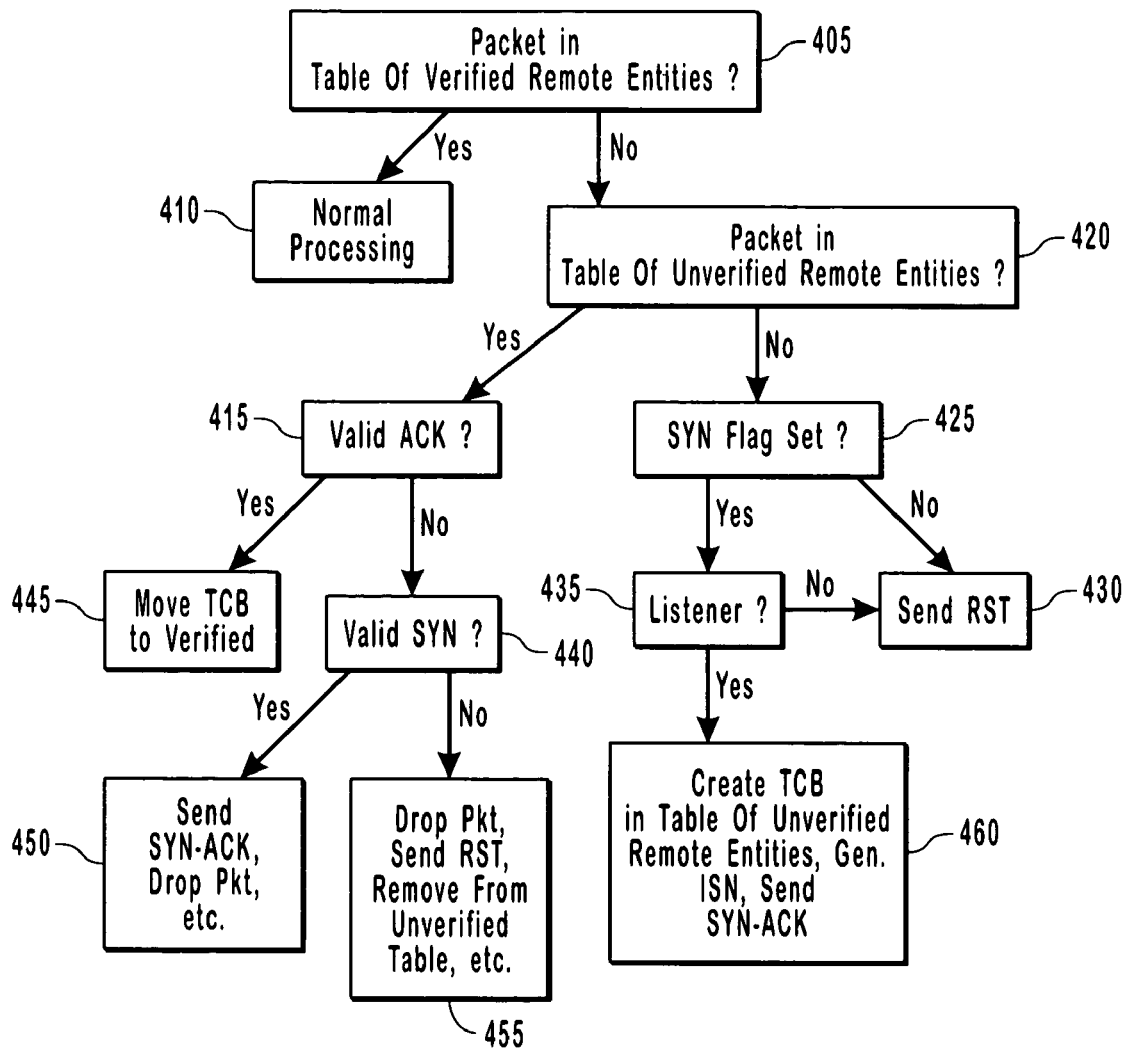
FIG. 4 illustrates a flow chart for preventing denial of service attacks on lookup tables in accordance with example embodiments.

FIG. 4 shows a flow chart for preventing DoSs on lookup tables in accordance with example embodiments. As shown in 405, and as mentioned above, a packet is received and a hash is performed on at least a portion of the connection information associated with the packet. Further, a portion of the hash is then used to determine if state information or a TCB exists for the packet. If the state information for the packet is in the table of verified remote entities, i.e., the flow follows the YES path from 405, the normal data transfer protocol is performed in 410. This could include normal TCP processing and could also include the deletion of TCB information from the table of verified remote entities upon ending the connection.

If, on the other hand, TCB information for the packet is not in the table of verified remote entities, i.e., the flow follows the NO path from 405, then a cryptographically secure hash (either software or hardware based) is used on at least a portion of the connection identifier information. A lookup in a table of unverified remote entities based on at least a portion of the generated hash value is performed in 420 to determine if packet information (i.e., state information or TCB) exists in the table. If state information for the packet exists in the table of unverified remote entities, i.e., the flow follows the YES path from 420, then the local server determines if the package is a valid ACK in 415. If the ACK flag is set, and if the ISN-plus-one value from the remote entity matches the expected value, i.e., the ACK is valid and the flow follows the YES path from 415, then the TCB may be moved in 445 from the table of unverified remote entities to the table of verified remote entities. As such, any subsequent messages received from the remote entity under this state will follow the normal data transfer processing protocol, e.g., TCP, as done in 405, 410. It is further noted that although this transfer of state information from one table to another introduces some overhead, it is only done one time per connection and is inconsequential to simply move the data.

Otherwise, if the ACK flag is not set, or if the ACK is otherwise not valid, i.e., the flow follows the NO path from 415, then the local server checks to see if the message or data packet includes a valid SYN in 440. If the data packet includes a valid SYN, i.e., the flow follows the YES path from 440, then any one of a number of options are available in 450. For example, the local server could send a SYN+ACK believing that a previous SYN+ACK sent was not properly received. Alternatively, the packet could be dropped, deleted, or any other number of normal data transfer processing techniques used in such a situation. If, however, the data packet includes a valid SYN, i.e., flow follows the NO path from 440 than any number of similar options as those in 450 are available in 455. For example, the system could conclude that it was under attack, and drop the packet, and remove the state information from the table of unverified remote entities. Alternatively, the local server may send a reset (RST) or some other indicator to the remote entity to inform them that the SYN packet was improperly received.

If state information or TCB for the packet is not in table of unverified remote entities, i.e., the flow follows the NO path from 420, this is an indication that this is an initialization or synchronization packet. Accordingly, the local server may check to see if a SYN flag is set within the packet in 425. If a SYN flag is set, i.e., the flow follows the YES path from 425, the local server determines whether or not there is a listener in 435. In particular, the local server determines if the local server has a port for receiving the type of traffic or data packets sent by the remote entity. If the local server is a listener, i.e., the flow follows the YES path from 435, then the local server can create a TCB in the table of unverified remote entities, generate an ISN and send a SYN+ACK in 460, as previously described. If on the other hand the local server is not a listener, then a similar response is made as if the SYN flag was not set in 425, i.e., the flow follows the NO path for either 435 or 425, which is that a RST is sent to the remote entity in 430.

The present invention may also be described in terms of methods comprising functional steps and/or non-functional acts. The following is a description of acts and steps that may be performed in practicing the present invention. Usually, functional steps describe the invention in terms of results that are accomplished whereas non-functional acts describe more specific actions for achieving a particular result. Although the functional steps and non-functional acts may be described or claimed in a particular order, the present invention is not necessarily limited to any particular ordering or combination of acts and/or steps.

Figure 5:
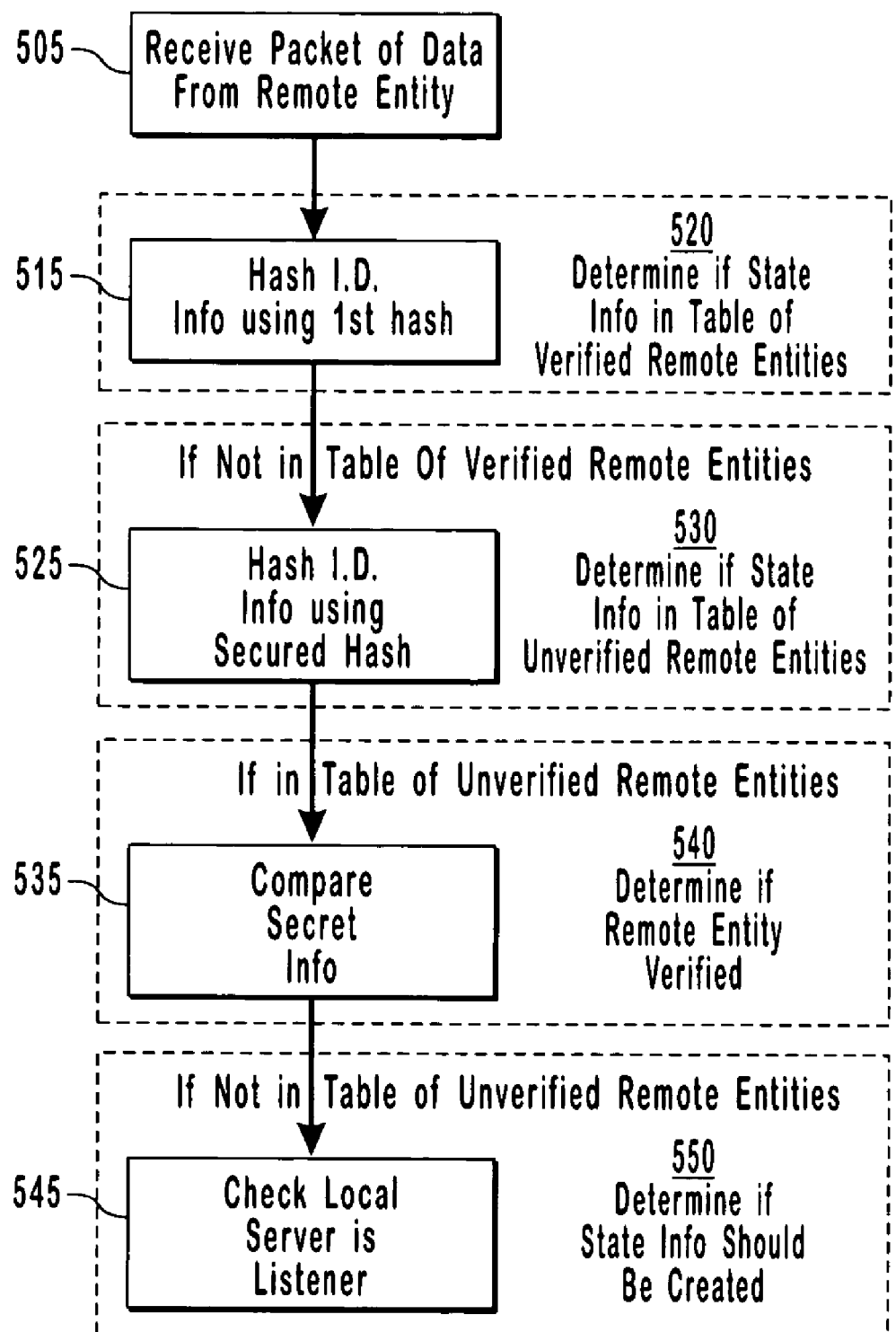
FIG. 5 shows example acts and steps for methods of applying a cryptographically secure hash to packets from unverified remote entities in accordance with example embodiments.

FIG. 5 shows example acts and steps for methods of applying a cryptographically secure hash to packets from unverified remote entities in accordance with example embodiments. For example, the process includes the act 505 of receiving a packet of data from a remote entity that includes connection identifier information. Further, a step 520 for determining if state information exists for the remote entity in a table of verified remote entities may include the act 515 of hashing at least a portion of the connection identifier information using a first hash function. The first hash function will normally be a simple hash function; however, it can also be a secure hash function that is either hardware or software based.

If the state information for the remote entity does not exist in the table of verified remote entities, the step 530 for determining if state information exists for the remote entity in a table of unverified remote entities may include the act 525 of hashing at least a portion of the connection identifier information using a second hash function that is cryptographically secure for determining if state information exists for the remote entity in a table of unverified remote entities. If the state information for the remote entity exists in the table of unverified remote entities, step 540 for determining if the remote entity can be verified such that state information can be moved to the table of verified remote entities may include the act 535 of comparing secret information provided within the packet of data with information previously supplied to the remote entity. This information may be any number of shared secrets, e.g., the ISN-plus-one.

Other embodiments provide that if the state information for the remote entity exists in the table of unverified remote entities, but remote entity cannot be verified, the process may further include the act of checking if the packet includes a synchronization message for determining how to respond to the unverified remote entity. If the packet of data includes a synchronization message, the local server may respond by either sending a synchronization-acknowledgement packet or by deleting the packet. If, however, the packet of data does not include a synchronization message, the local server may respond by one or more of the following: deleting the packet, retransmitting the original message to the remote entity or removing the state information from the table of unverified remote entities.

On the other hand, if state information for the remote entity does not exist in the table of unverified remote entities, a step 550 for determining if state information for the remote entity should be created in the table of unverified remote entities may include the act 545 of checking whether the local server is a listener that may accept the packet of data from the remote entity. If the local sever is a listener that may accept the packet, other embodiments provide for creating state information for the remote entity within the table of unverified remote entities, and sending a synchronization-acknowledgement packet that includes an initial sequence number to the remote entity.

Other embodiments provide that if state information for the remote entity does not exist in either the table of verified remote entities or the table of unverified remote entities, and the server is not a listener that may accept the package of data from the remote entity, then a reset command may be sent to the remote entity to indicate that the packet was not verifiable and needs to be resent.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a local server that receives data from one or more remote entities over a data transport protocol, a method of applying a cryptographically secure hash to packets from unverified remote entities for preventing denial of service attacks on lookup tables used to store state information for one or more remote entities, while maintaining the performance of the local server for packets from verified remote entities, the method comprising the acts of:
    receiving a packet of data from a remote entity that includes connection identifier information;
    hashing at least a portion of the connection identifier information using a first hash function to generate a first hash, the first hash identifying an entry in a first table of verified remote entities, the first table for storing remote entities that have a confirmed connection identifier;
    determining when state information for the remote entity exists at the entry in the first table of verified remote entities, and performing standard data transport protocol on the packet of data; and
    determining when state information for the remote entity does not exist in the first table of verified remote entities and performing the following:
        hashing at least a portion of the connection identifier information using a second hash function that is cryptographically secure to generate a second hash, the second hash function having a lower probability than the first hash function of generating an identical hash for connection identifier information from more than one remote entity, the second hash identifying a second entry in a second table of unverified remote entities, the second table for storing remote entities that do not have a confirmed connection identifier;
        determining when state information for the remote entity exists at the second entry in the second table of unverified remote entities, and comparing secret information received within the packet of data with other information which had been previously supplied to the remote entity by the local server for determining if the remote entity can be verified such that state information can be moved to the first table of verified remote entities; and
        determining when state information for the remote entity does not exist in the second table of unverified remote entities and checking whether the local server is a listener that may accept the packet of data from the remote entity for determining when the state information for the remote entity should be created in the second table of unverified remote entities.

2. The method of claim 1, wherein the standard data transport protocol is transmission control protocol.

3. The method of claim 1, wherein when state information for the remote entity exists in the second table of unverified remote entities, but the remote entity cannot be verified, the method further comprises the act of:
    checking if the packet includes a synchronization message for determining how to respond to the unverified remote entity.

4. The method of the claim 3, wherein if the packet of data includes a synchronization message, the local server responds by either sending a synchronization-acknowledgement packet or by deleting the packet.

5. The method of the claim 3, wherein if the packet of data does not include a synchronization message, the local server responds by one or more of the following: deleting the packet, retransmitting the original message to the remote entity or removing the state information from the second table of unverified remote entities.

6. The method of claim 1, wherein the first hash function is also a cryptographically secured hash function.

7. The method of claim 6, wherein the first and second hash functions are one of hardware based or software based.

8. The method of claim 1, wherein when state information for the remote entity does not exist in either the first table of verified remote entities or the second table of unverified remote entities, and wherein the server is a listener that may accept the package of data from the remote entity, the method further comprising the acts of:
    creating state information for the remote entity within the second table of unverified remote entities; and
    sending a synchronization-acknowledgement packet that includes an initial sequence number to the remote entity.

9. The method of claim 1, wherein when state information for the remote entity does not exist in either the first table of verified entities or the second table of unverified entities, and the server is not a listener that may accept the package of data from the remote entity, the method further comprises the act of:

sending a reset command to the remote entity for indicating that the packet was not verifiable and needs to be resent.

10. The method of claim 1, wherein the remote entity becomes verified by sharing a secret sent to the remote entity by the local server.

11. In a local server that receives data from one or more remote entities over a data transport protocol, a method of applying a cryptographically secure hash to packets from unverified remote entities for preventing denial of service attacks on lookup tables used to store state information for one or more remote entities, while maintaining the performance of the local server for packets from verified remote entities, the method comprising:

an act of receiving a packet of data from a remote entity that includes connection identifier information;

an act of hashing at least a portion of the connection identifier information using a first hash function to generate a first hash, the first hash identifying an entry in a first table of verified remote entities, the first table for storing remote entities that have a confirmed connection identifier;

a step for determining when state information exists for the remote entity in the first table of verified remote entities; when the state information for the remote entity does not exist in the first table of verified remote entities, performing the following:

an act of hashing at least a portion of the connection identifier information using a second hash function that is cryptographically secure to generate a second hash, the second hash function having a lower probability than the first hash function of generating an identical hash for connection identifier information from more than one remote entity, the second hash identifying a second entry in a second table of unverified remote entities, the second table for storing remote entities that do not have a confirmed connection identifier;

a step for determining when state information exists for the remote entity in the second table of unverified remote entities;

when the state information exists in the second table of unverified remote entities, a step for determining when the remote entity can be verified such that state information can be moved to the first table of verified remote entities; and when state information does not exist in the second table of unverified remote entities; a step for determining when state information for the remote entity should be created in the second table of unverified remote entities.

12. The method of claim 11, wherein when the state information for the remote entity does exist in the first table of verified remote entities, standard data transport protocol processing is performed.

13. The method of claim 12, wherein the standard data transport protocol is transmission control protocol.

14. The method of claim 11, wherein when the state information exists in the second table of unverified remote entities, but the remote entity cannot be verified, the method further comprises the act of:

checking if the packet includes a synchronization message for determining how to respond to the unverified remote entity.

15. The method of the claim 14, wherein if the packet of data includes a synchronization message, the local server responds by either sending a synchronization-acknowledgement packet or by deleting the packet.

16. The method of the claim 14, wherein if the packet of data does not include a synchronization message, the local server responds by one or more of the following: deleting the packet, retransmitting the original message to the remote entity or removing the state information from the second table of unverified remote entities.

17. The method of claim 11, wherein the first hash function is also a cryptographically secured hash function, and wherein the first and second hash functions are one of either hardware based or software based.

18. The method of claim 11, wherein when state information does not exist in either the first table of verified remote entities or the second table of unverified remote entities, and wherein the step for determining when state information for the remote entity should be created in the second table of unverified remote entities includes the act of checking whether the local server is a listener that may accept the package of data from the remote entity, the method further comprising the acts of:

creating state information for the remote entity within the second table of unverified remote entities; and sending a synchronization-acknowledgement packet that includes an initial sequence number to the remote entity.

19. The method of claim 11, wherein when state information does not exist in either the first table of verified entities or the second table of unverified entities, the step for determining if state information for the remote entity should be created in the second table of unverified remote entities includes the act of checking whether the local server is a listener that may accept the package of data from the remote entity, and the server is not a listener that may accept the package of data from the remote entity, the method further comprising the act of:

sending a reset command to the remote entity for indicating that the packet was not verifiable and needs to be resent.

20. For a local server that receives data from one or more remote entities over a data transport protocol, a computer program product comprising computer readable storage media storing computer executable instructions that implement the method recited in claim 1.

21. The computer program product of claim 20, wherein when the state information for the remote entity exists in the second table of unverified remote entities, but the remote entity cannot be verified, the method further comprises the act of:

checking if the packet includes a synchronization message for determining how to respond to the unverified remote entity.

22. The computer program product of the claim 21, wherein if the packet of data includes a synchronization message, the local server responds by either sending a synchronization-acknowledgement packet or by deleting the packet.

23. The computer program product of the claim 21, wherein if the packet of data does not include a synchronization message, the local server responds by one or more of the following: deleting the packet, retransmitting the original message to the remote entity or removing the state information from the second table of unverified remote entities.

24. The computer program product of claim 20, wherein the first hash function is also a cryptographically secured hash function, and wherein the first and second hash functions are one of hardware based or software based.

25. The computer program product of claim 20, wherein when state information for the remote entity does not exist in either the first table of verified remote entities or the second table of unverified remote entities, and wherein the server is a listener that may accept the package of data from the remote entity, the method further comprising the acts of:
   creating state information for the remote entity within the second table of unverified remote entities; and
   sending a synchronization-acknowledgement packet that includes an initial sequence number to the remote entity.

26. The computer program product of claim 20, wherein when state information for the remote entity does not exist in either the first table of verified remote entities or the second table of unverified remote entities, and the server is not a listener that may accept the package of data from the remote entity, the method further comprises the act of:
   sending a reset command to the remote entity for indicating that the packet was not verifiable and needs to be resent.

27. For a local server that receives data from one or more remote entities over a data transport protocol, a computer program product comprising computer readable storage media storing computer executable instructions that implement the method recited in claim 11.

28. The computer program product of claim 27, wherein when the state information exists in the second table of unverified remote entities, but the remote entity cannot be verified, the method further comprises the act of:
   checking if the packet includes a synchronization message for determining how to respond to the unverified remote entity.

29. The computer program product of the claim 28, wherein if the packet of data includes a synchronization message, the local server responds by either sending a synchronization-acknowledgement packet or by deleting the packet.

30. The computer program product of the claim 28, wherein if the packet of data does not include a synchronization message, the local server responds by one or more of the following: deleting the packet, retransmitting the original message to the remote entity or removing the state information from the second table of unverified remote entities.

31. The computer program product of claim 27, wherein the first hash function is also a cryptographically secured hash function, and wherein the first and second hash functions are one of either hardware based or software based.

32. The computer program product of claim 27, wherein when state information does not exist in either the first table of verified remote entities or the second table of unverified remote entities, and wherein the step for determining when state information for the remote entity should be created in the second table of unverified remote entities includes the act of checking whether the local server is a listener that may accept the package of data from the remote entity, the method further comprising the acts of:
   creating state information for the remote entity within the second table of unverified remote entities; and
   sending a synchronization-acknowledgement packet that includes an initial sequence number to the remote entity.

33. The computer program product of claim 27, wherein when state information does not exist in either the first table of verified remote entities or the second table of unverified remote entities, the step for determining if state information for the remote entity should be created in the second table of unverified remote entities includes the act of checking whether the local server is a listener that may accept the package of data from the remote entity, and wherein the server is not a listener that may accept the package of data from the remote entity, the method further comprises the act of:
   sending a reset command to the remote entity for indicating that the packet was not verifiable and needs to be resent.

34. The computer program product of claim 27, wherein the remote entity becomes verified by sharing a secret sent to the remote entity by the local server.

* * * * *